US007634763B2

(12) United States Patent
Wain et al.

(10) Patent No.: US 7,634,763 B2
(45) Date of Patent: Dec. 15, 2009

(54) EXTENSIBLE MULTI-LANGUAGE COMPILATION

(75) Inventors: Mark Nathan Wain, Seattle, WA (US); Dharma Shukla, Sammamish, WA (US); Mayank Mehta, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1201 days.

(21) Appl. No.: 10/678,870

(22) Filed: Oct. 3, 2003

(65) Prior Publication Data

US 2005/0015236 A1 Jan. 20, 2005

Related U.S. Application Data

(60) Provisional application No. 60/487,450, filed on Jul. 15, 2003.

(51) Int. Cl.
G06F 9/45 (2006.01)

(52) U.S. Cl. .................... 717/140; 717/143; 717/146

(58) Field of Classification Search .................. 717/140
See application file for complete search history.

(56) References Cited

U.S. PATENT DOCUMENTS

| 5,774,728 | A | * | 6/1998 | Breslau et al. ............... 717/141 |
| 5,815,716 | A | * | 9/1998 | Horiguchi .................... 717/157 |
| 6,799,718 | B2 | * | 10/2004 | Chan et al. ................... 235/375 |
| 6,836,883 | B1 | * | 12/2004 | Abrams et al. ............... 717/140 |
| 7,076,772 | B2 | * | 7/2006 | Zatloukal .................... 717/147 |
| 7,107,578 | B1 | * | 9/2006 | Alpern ........................ 717/124 |
| 7,127,702 | B2 | * | 10/2006 | Seki ........................... 717/107 |
| 7,219,338 | B2 | * | 5/2007 | Venter ......................... 717/140 |
| 7,254,814 | B1 | * | 8/2007 | Cormier et al. .............. 718/106 |
| 7,299,454 | B2 | * | 11/2007 | Pugh et al. ................... 717/125 |
| 2004/0194072 | A1 | * | 9/2004 | Venter ......................... 717/140 |
| 2005/0015759 | A1 | * | 1/2005 | Zatloukal .................... 717/140 |

OTHER PUBLICATIONS

Mason, D.V., "A Functional Intermediate Form for Diverse Source Languages", *IBM Centre for Advanced Studies Conference, Proceedings of the 1996 Conference of the Centre for Advanced Studies on Collaborative Research*, 1996, 27.

Maybee, M.J. et al., "Multilanguage Interoperability in Distributed Systems", *International Conference on Software Engineering, Proceedings of the 18th International Conference on Software Engineering*, 1996, 451-463.

Schmidt, U. et al., "A Multi-Language Compiler System with Automatically Generated Codegenerators", *Symposium on Compiler Construction, Proceedings of the 1984 SIGPLAN Symposium on Compiler Construction*, 1984, 202-212.

* cited by examiner

*Primary Examiner*—Tuan Q Dam
*Assistant Examiner*—Isaac T Tecklu
(74) *Attorney, Agent, or Firm*—Woodcock Washburn LLP (57) ABSTRACT

To provide for multi-language compilation, a protocol is established for compilers. Each of at least two compilers implements the protocol. A framework is developed which discovers compilers which have implemented the protocol. The framework allows multi-language compilation using and coordinating the compliant compilers. The framework is extensible. When a new protocol-compliant compiler is discovered, the language compiled by the new compiler can be compiled using the framework and the capabilities of the protocol-compliant compilers. Similarly, a multi-language extensible design tool may be created using protocol-compliant design tools.

34 Claims, 4 Drawing Sheets

EXTENSIBLE MULTI-LANGUAGE COMPILATION

CROSS REFERENCE TO RELATED APPLICATIONS

This application claims priority to and the benefit of the filing date of U.S. provisional patent application, Ser. No. 60/487,450 filed on Jul. 15, 2003 entitled "Extensible Multi-Language Compilation."

FIELD OF THE INVENTION

This invention relates in general to the field of computer language compilation. More particularly, this invention relates the integrated use of multiple computer languages.

BACKGROUND OF THE INVENTION

Computers generally are programmed using computer languages. Code written in most computer languages must first be compiled. This process of compilation breaks human-readable source code in the computer language into low-level instructions and can be in the form of an executable. This executable can then be run on a computer (typically on a specific platform) for the desired effect. The process of compilation is done by an application known as a compiler.

Tools such as editors or visual design tools exist which assist users in writing code. These tools may be graphics-based or text-based, and can include on-the-fly syntax checking and background compilation, among other benefits for users.

Computer languages may be specialized. Some languages are general purpose programming languages (GPLs). These may include languages geared towards specific applications. For example, several computer languages exist which are directed towards mathematical and statistical applications. These include Fortran, C, Ada, COBOL, LISP, Pascal, Prolog, BASIC, C++, C#, Java, among other languages. Additionally, several computer languages exist which are directed towards business applications. These include languages such as BPEL4WS (Business Process Execution Language for Web Services) and XLang. Each language may have specific advantages and capabilities for performing the specialized functions to which they are addressed. Additionally, editors for each language may provide assistance specialized for the function of the language.

Additionally, languages may also be domain specific languages. For example, XML-based domain specific languages including BPEL (business process execution languages), which is a language used to describe and execute business processes. XSLT, XSD, and XQuery are other examples of XML-based domain specific languages.

It can be seen that because of the different advantages and capabilities of the different languages, it may be useful to combine the advantages and capabilities of one language with the advantages and capabilities of a second language.

One way to do this is to use a first language to create a first executable, and a second language to create a second executable. Some result file of the first executable may be used by the second executable. However, this solution has obvious limitations. First, in this solution, a strict ordering is imposed from an outside source on the interchange between the two executables. While it may be possible to run a series of executables written in different languages, the order of running the executables is imposed from outside of the executables, and the exchange of data may not be performed in a way which is efficient for the executables. Additionally, only a result file is exchanged between executables, the functionality of one executable is not accessible by any other executable. This severely limits the usefulness of this solution.

Another possible solution is to create a customized compiler which allows the use of code from a second language within a program written in a first language. The customized compiler can compile code in the first language, can recognize when a second language has been used, and can compile the code in the second language in order to create a unified executable. For example, some customized C compilers can recognize the use of code in the assembly language and can compile the assembly language code along with the C language code in creating an executable.

This solution also has disadvantages. First, a customized compiler must be created for each combination of languages which may be used. This will involve significant time and resource expenditure for each new combination which is required. Second, the customized nature of the compiler hinders the extensibility of the compiler to include a new language. Additionally, a customized editor must also be created, or editor functionality will not be provided to users.

Thus, there is a need for a solution which overcomes these and other drawbacks of prior art compilers.

SUMMARY OF THE INVENTION

In order to provide for multi-language compilation, in one embodiment, a protocol is established for compilers. For a language to be included in the pool of languages which may be compiled together, a compiler for the language which conforms to the set of interfaces included in the protocol must be used. This protocol enables the extensible addition of new languages by adding new compilers which conform to the protocol to be added. Thus, the protocol provides a "plug-in" capability for new languages that may be added to a pool of languages useable in multi-language compilation. This extensibility allows flexibility and openness for users.

The protocol-compliant compilers may be used together in two environments: an editing environment and a compilation environment. In one embodiment, these environments are provided in a unitary environment.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF THE PREFERRED EMBODIMENTS

Overview

In order to provide for multi-language compilation, in one embodiment, a protocol is established for compilers. For a language to be included in the pool of languages which may be compiled together, a compiler for the language which conforms to the set of interfaces included in the protocol must be used. This protocol enables the extensible addition of new languages by adding new compilers which conform to the protocol to be added. Thus, the protocol provides a "plug-in" capability for new languages that may be added to a pool of languages useable in multi-language compilation. This extensibility allows flexibility and openness for users.

The protocol-compliant compilers may be used together in two environments: an editing environment and a compilation environment. In one embodiment, these environments are provided in a unitary environment.

The protocol, in one embodiment, is declarative and allows the user to configure the protocol at different levels including the target platform for the executable. Additionally, the protocol allows the configuration of constraints to be imposed during compilation, for example, how reference may be made to another language's artifacts or pointers. Cross-language referencing may also be configured using the protocol. This allows control over how code in a first language compiled by the multi-language compiler can access language-specific constructs in a second language.

Exemplary Computing Environment

Figure 1:
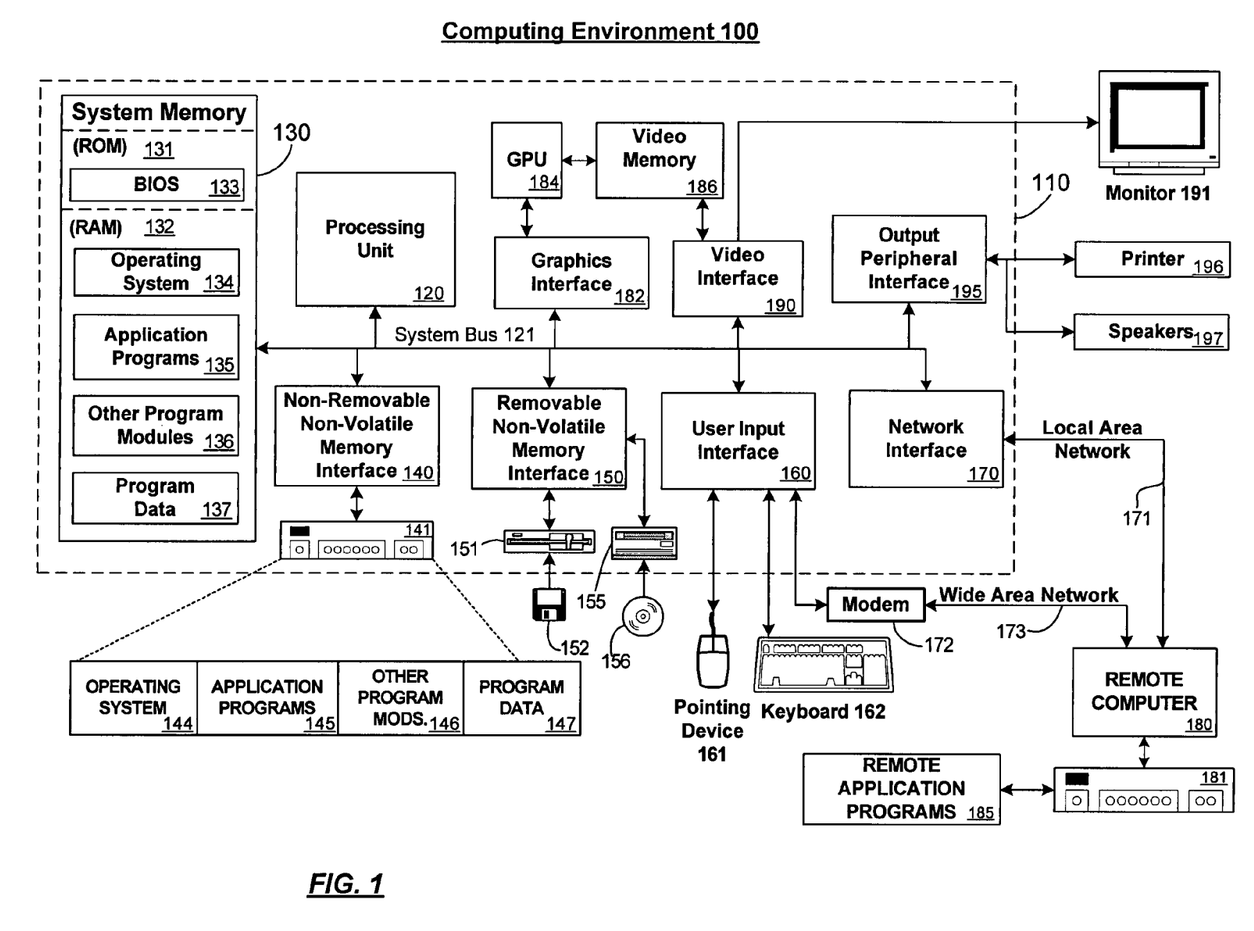
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics. set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Extensible Multi-Language Compilation—Protocol

As previously described, a protocol is established for compilers, and for a compiler to be used in the multi-language compilation, the compiler must conform to the protocol. The protocol consists of a set of interfaces which are implemented by the compiler. Extensibility is provided by the addition of new protocol-compliant compilers.

The protocol, in one embodiment, is declarative and allows the user to configure the protocol at different levels including the target platform for the executable. Additionally, the protocol allows the configuration of constraints to be imposed during compilation, for example, how reference may be made to another language's artifacts or pointers. Cross-language referencing may also be configured using the protocol. This allows control over how code in a first language compiled by the multi-language compiler can access language-specific constructs in a second language.

The protocol both ensures that the various compilers can be integrated into a multi-language compiler and defines inter-relationships between the various languages which can be used in a resulting multi-language editor and a resulting multi-language compiler. Thus, a compiler which can be integrated into a multi-language compiler (a compiler component) which adheres to a protocol becomes a first-class citizen of a system which combines the functionality of all such first-class citizens.

Similarly, the protocol can be implemented by a design tool for a language, which indicates that the design tool can be used in order to create a multi-language design tool. Thus, as well as enabling the creation of a multi-language compiler, a multi-language design tool can be created which can be used to produce source code in a combination of the different languages which can be compiled by a multi-language compiler, as long as a compiler for each language used in the code is implemented in the multi-language compiler. This design tool can work in tandem with a multi-language compiler.

Protocol Interfaces

In one embodiment, the protocol implemented by compilers and design tools are described in terms of interfaces. These interfaces are abstract classes which are required to be implemented in order to be protocol-compliant.

A number of different types of interfaces may be included in a component. In one embodiment, these interfaces include one or more of the following:
  discoverability interfaces;
  design time interfaces;
  compilation time interfaces;
  background compilation time interfaces;
  debugging interfaces; and
  error interfaces.

Discoverability interfaces allow the protocol-compliant component to be discovered. The component is directed to a specific language. Design-time interfaces define the actions of a multi-language design tool when code in the specific language is being written.

Compilation time interfaces define how code in the specific language should be compiled, and how interaction between code in other languages can occur with code in the specific language. The normalized referencing scheme for referencing structures written in the specific language is also defined. Additionally, compilation order—how to build a dependency tree, what gets compiled first—is defined via the interfaces for the different languages being compiled. Background compilation interfaces perform the same function, for background compilation, for example, in a design tool.

Debugging interfaces define how debugging in the specific language can occur. Error interfaces describe how errors propagate, what error-reporting protocol is, what the meaning of various error objects are, how errors may be resolved, among other error handling.

Figure 2:
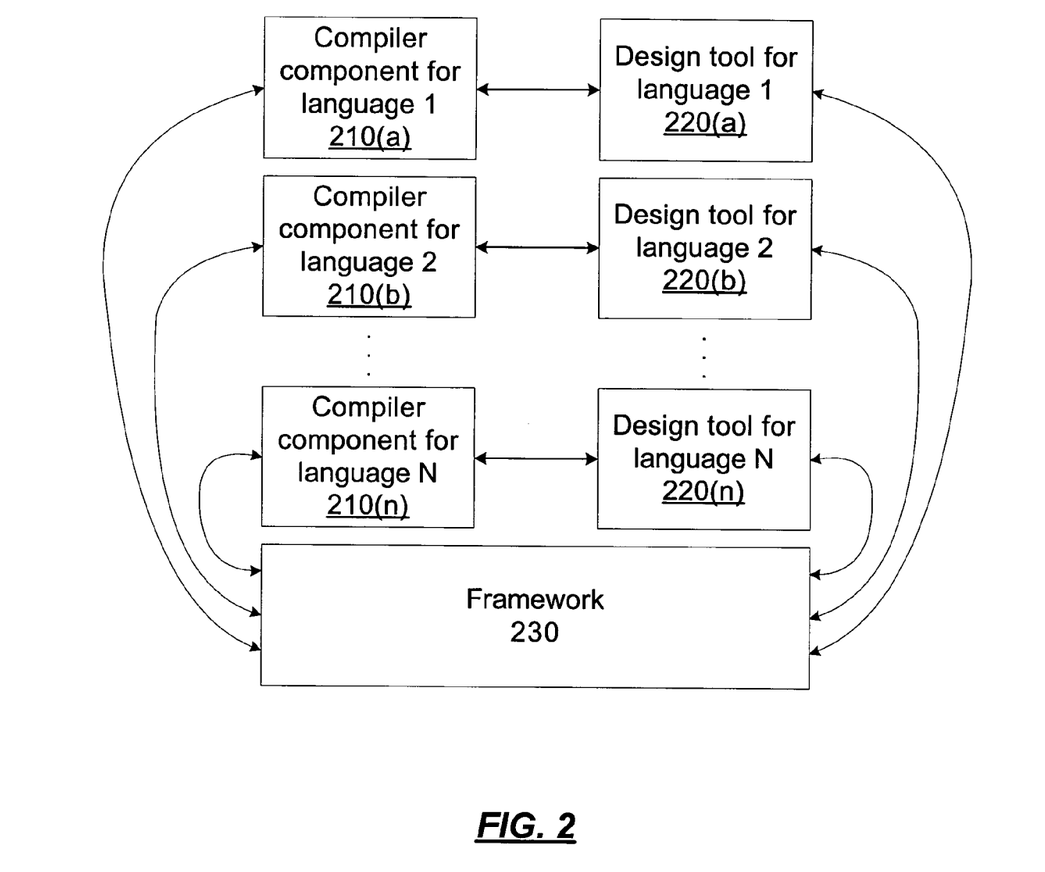
FIG. 2 is a block diagram of one example implementation of an embodiment of the invention.

Discovery of a Protocol-Compliant Compiler Components and Creation of Multi-Language Compilers and Design Tools As shown in FIG. 2, an environment or framework 230 is provided in which compiler components can be used. In one embodiment, the environment initially discovers protocol-compliant compiler components 210. In one embodiment, compliance with protocol includes exposing an interface by which the environment can query a compiler component 210 to determine its implementation of protocol. Compliant compiler components 210 are registered with the environment.

Additionally, design tool components 220 are queried. In one embodiment, compliance with protocol includes exposing an interface by which the environment can query a design tool component 220 to determine its implementation of protocol. Compliant design tool components 220 are registered with the environment.

In one embodiment, an association is made between a compliant design tool 220 for a specific language and a compliant compiler component 210 for the language. In one embodiment, users communicate with the compliant design tools 220 within a multi-language design tool structure. In such embodiments, this association allows the design tool 220 for the language to enforce restrictions from the compiler component 210. For example, if the compiler component 210 for a first language supports only certain forms of referencing of a specific construct from that first language, the design tool 220 for the first language can discover this limited support and can provide a user with guidance and error messages based on the limitations imposed by the compiler component 210.

The discovery of components (both compilers and design tools) in one embodiment is done using interprocess communication. In one embodiment, this interprocess communication is facilitated using a Component Object Model—(COM—) based system.

Languages Used in Multi-Language Combination

In one embodiment, the compilers used for the multi-language combination for a multi-language compiler work with a common target platform. This commonality means that the target platform for each compiler will also be the target platform for the multi-language compiler. This similarity will allow simplicity in framework 230 connecting the various compilers. For example, where the common platform requires an executable which includes a metadata portion and a MSIL (Microsoft Intermediate Language) portion, each compiler component 210 must produce an executable consisting of such a metadata portion and MSIL.

In another embodiment, compilers with different target platforms may be combined. In this embodiment, the framework 230 must be able to reconcile differing target platforms and produce an executable which runs on a framework 230 target platform.

Using a Multi-Language Design Tool

When the framework 230 has discovered design tools 220 for multiple languages, the functionality of these design tools 220, along with the protocol information for the compliant design tools 220 and the protocol information for the associated compiler components 210 can be used to create multi-language source code. In one embodiment, the user communicates directly with the design tools 220. In another embodiment, the compilers are used to create a multi-language design tool. This tool may take the form of an environment presenting the user interface of each design tool 220, allowing the user to use each design tool 220 and to access additional design functionality related to the interrelationships between the code used with each design tool. In still another embodiment, the tool is a completely integrated multi-language design tool in which the functionality of the design tools 220 is incorporated.

The multi-language design tool allows the user to write code in a first language (language 1) and to create a construct in a second language (language 2). The code in language 1 can reference the construct in language 2 using a normalized metadata representation. As shown in FIG. 2, the design functionality for language 1 is provided by design tool 220(a) and the design functionality for language 2 is provided by design tool 220(b). As described above, the user may interact directly with these design tools 220, may interact with the design tools 220 within a larger context in which the user interface of each design tool is accessed within a larger framework, or may interact with the functionality of design tools through a completely integrated multi-language design tool in which the functionality (if not the user interfaced) of the design tools 220 is incorporated.

The parameters for this normalized metadata representation are given by the protocol for the compiler component 210 for language A (governing how code in language A can reference other constructs) and the compiler component 210 for language B (governing how constructs in language B can be referenced.) In another embodiment these parameters are not reflected in a design tool, but when compilation occurs improper references are not compiled and, in one embodiment, error messages are returned.

Other inter-language design assistance may also be provided. For example, code completion is provided in some editors which completes a name of a structure, or provides the possible subparts of a structure which has been defined when the user indicates that a subpart for a specified structure will be used. This functionality may also be provided across languages, and code completion in language A for a reference which has been defined in language B will be provided.

Using a Multi-Language Compiler

When the framework 230 has discovered protocol-compliant compiler components 210 for various languages, a multi-language compiler can be created. Code in the multiple languages, whether created in a multi-language design tool context or otherwise, can then be compiled. This is done by the framework 230, which may include compiler management functionality, which performs thread management, up-to-date checking, dependency walking, among other compiler management functions.

If compilation proceeds without problems, an executable is created by the compiler management functionality in the framework 230. In one embodiment, if there are compilation problems, either syntactical or other problems in a code segment written in only one language, or inter-language errors, error messages are presented to the user. Errors from the various compiler components 210 are collected by the framework 230. These errors are then presented to the user for resolution. In one embodiment, the provision of error messages occurs using a multi-language design tool as described above.

Compilation may occur when a user requests the compilation of code. Additionally, such compilation may also occur at design time, for background compilation.

In this way, multiple-language source code can be compiled. An additional language may be used in the multiple language compiler by adding compiler components 210 for the additional language. When such a new component is discovered, the language compiled by the new component can be compiled by the multiple-language compiler.

Extensible Compiler Usage

According to one embodiment of the invention, an executable is produced from many languages to run on a software platform. Compilation from the different languages is supported by compilers which include functionality which allows referencing across the different languages. A platform is provided, in one embodiment, which allows the compilers to work together to produce the executable.

In one embodiment, multiple-language compilation is provided by (i) discovering at least two compiler components which implement a prespecified protocol; and (ii) providing a framework which uses the compiler components to produce an executable from source code in the languages corresponding to the compiler components. Unified error collection functionality and debugging functionality is also provided.

Figure 3:
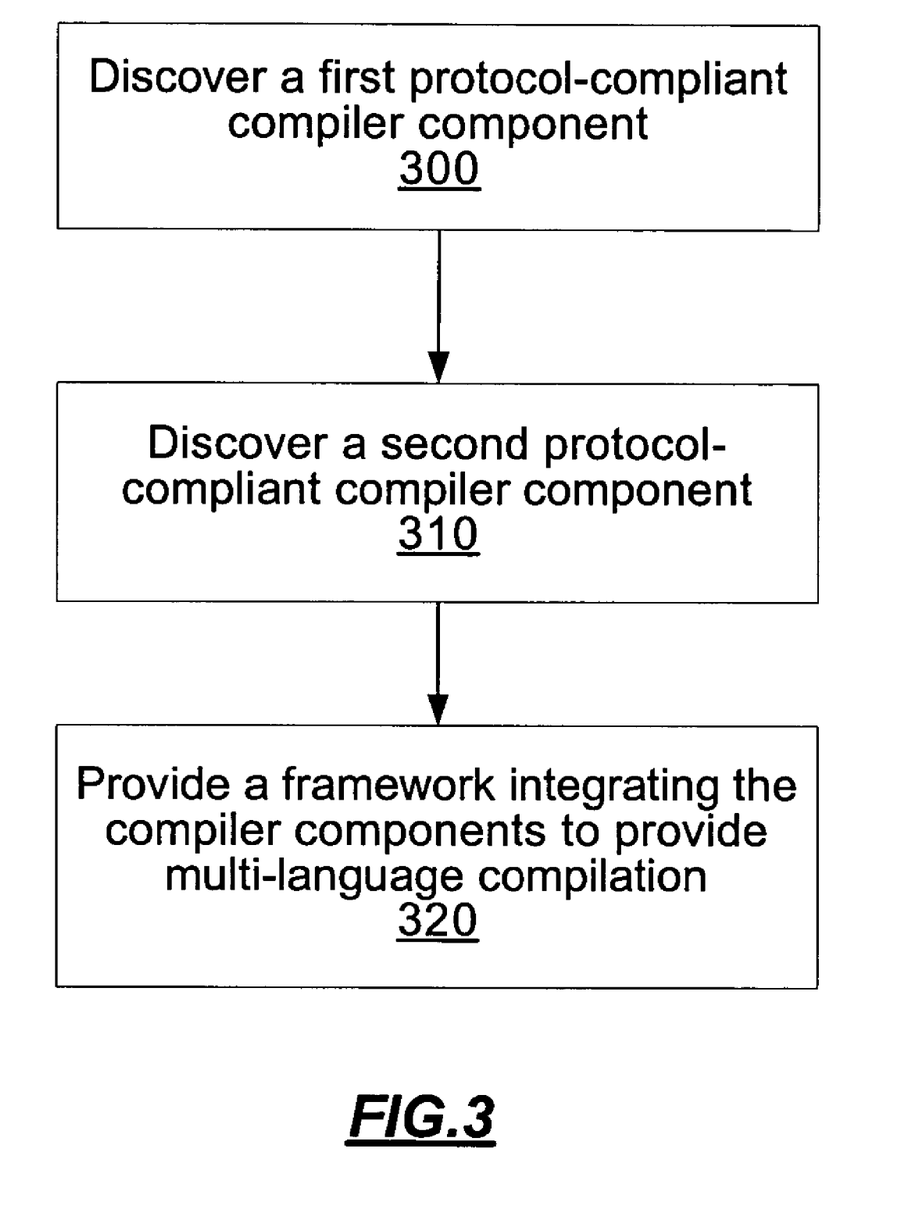
FIG. 3 is a flow diagram of multiple-language compilation according to one embodiment of the invention.

FIG. 3 is a flow diagram of multiple-language compilation according to one embodiment of the invention. In step 300, a first protocol-compliant compiler component is discovered. In step 310, a second protocol-compliant compiler component is discovered. In step 320, a framework is provided which integrates the compiler components to provide multi-language compilation.

In another embodiment, multiple-language editing is provided by (i) discovering at least two design tools which implement a prespecified protocol; and (ii) providing a framework which uses the design tools to produce a user interface which provides functionality for editing code in multiple languages corresponding to the design tools.

Figure 4:
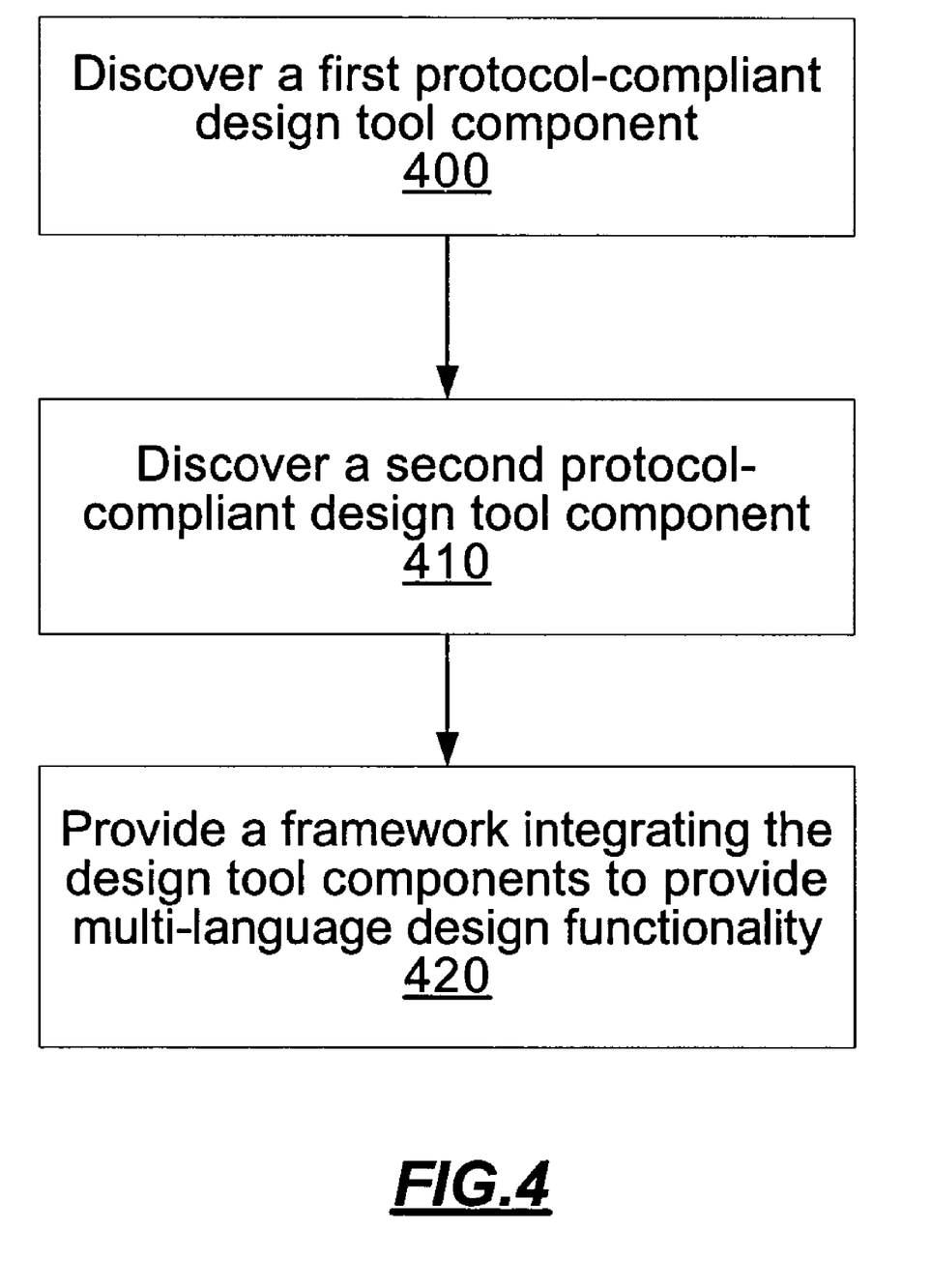
FIG. 4 is a flow diagram of multiple-language design tool provision according to one embodiment of the invention.

FIG. 4 is a flow diagram of multiple-language design tool provision according to one embodiment of the invention. In step 400, a first protocol-compliant design tool component is discovered. In step 410, a second protocol-compliant design tool component is discovered. In step 420, a framework is provided which integrates the compiler components to provide a multi-language design tool.

In still another embodiment, multiple-language editing is provided by (i) discovering at least two compiler components which implement a prespecified protocol including requirements for inter-language reference; (ii) discovering at least two design tools which implement a prespecified protocol; and (iii) providing a framework which uses the design tools to produce a user interface which provides functionality for editing code in multiple languages corresponding to the compiler components—including inter-language reference requirements.

In another embodiment, multiple-language editing is provided by (i) discovering at least two compiler components which implement a prespecified protocol including requirements for inter-language reference; (ii) discovering at least two design tools which implement a prespecified protocol; and (iii) providing a framework which framework which uses the design tools to produce a user interface which provides functionality for editing code in multiple languages and allows background compilation as per requirements of compiler components.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method for multi-language compilation comprising:
    discovering a first compiler component that conforms to a set of interfaces included in a prespecified protocol and provides compilation of code in a first language;
    discovering a second compiler component that conforms to the set of interfaces included in said prespecified protocol and provides compilation of code in a second language, wherein the discovery of the first compiler component and the second compiler component is effected using an inter-process communication; and
    providing a first framework which uses said first compiler component and said second compiler component to provide multi-language compilation, wherein the framework integrates the first compiler component and the second compiler component to create a multi-language compiler,
    where said prespecified protocol comprises a discoverability interface, and where said discovering a first compiler component that conforms to a set of interfaces included in a prespecified protocol occurs using said discoverability interface implemented in said first compiler component and said discovering a second compiler component that conforms to the set of interfaces included in said prespecified protocol occurs using said discoverability interface implemented in said second compiler component.

2. The method of claim 1, further comprising:
    discovering a third compiler component which implements said prespecified protocol; and
    providing a second framework which integrates said first, second, and third compiler components to provide multi-language compilation.

3. The method of claim 1, where said prespecified protocol comprises a compilation time interface, and where said provision of multi-language compilation occurs using said compilation time interface implemented in said first compiler component, and said compilation time interface implemented in said second compiler component.

4. The method of claim 3, where said compilation time interface comprises a normalized referencing scheme describing how code in other languages references code compiled by a compiler implementing said normalized referencing scheme.

5. The method of claim 3, where said compilation time interface comprises data regarding how dependency trees are to be built.

6. The method of claim 3, where said compilation time interface comprises data regarding the order of compilation of different languages in which code to be compiled has been written.

7. The method of claim 1, where said prespecified protocol comprises a debugging interface, and where said first framework further provides multi-language debugging according to information from said debugging interface.

8. The method of claim 1, where said prespecified protocol comprises an error interface, and where said first framework further provides multi-language error handling according to information from said error interface.

9. The method of claim 1, where said first framework further provides a multi-language design tool for designing code comprising code portions in said first language and code portions in said second language.

10. The method of claim 9, where said prespecified protocol comprises a design time interface, and where said multi-language design tool uses said design time interface corresponding to a compiler for a given language to control designing of code in said given language.

11. The method of claim 9, where said prespecified protocol comprises a background compilation time interface, and where said multi-language design tool uses a background compilation time interface corresponding to a compiler for a given language to control background compilation functionality for code in said given language.

12. A method for multi-language code editing comprising:
discovering a first design tool that conforms to a set of interfaces included in a prespecified protocol and provides design assistance for code in a first language;
discovering a second design tool that conforms to the set of interfaces included in the prespecified protocol and provides design assistance for code in a second language, wherein the discovery of the first design tool and the second design tool is effected using an inter-process communication; and
providing a framework which integrates said first design tool and said second design tool to provide multi-language editing, wherein the framework creates a multi-language design tool based on the first language and the second language,
where said prespecified protocol comprises a discoverability interface, and where said discovering a first design tool that conforms to a set of interfaces included in a prespecified protocol occurs using said discoverability interface implemented in said first design tool and said discovering a second design tool that conforms to the set of interfaces included in said prespecified protocol occurs using said discoverability interface implemented in said second design tool.

13. A method for multi-language code editing comprising:
discovering a first compiler component that conforms to a set of interfaces included in a prespecified protocol and provides compilation of code in a first language;
discovering a second compiler component that conforms to the set of interfaces included in said prespecified protocol and provides compilation of code in a second language;
discovering a first design tool that conforms to the set of interfaces included in the prespecified protocol and provides design assistance for code in said first language;
discovering a second design tool that conforms to the set of interfaces included in the prespecified protocol and provides design assistance for code in said second language,
wherein the discovery of the first compiler component, the second compiler component, the first design tool, and the second design tool is effected using an inter-process communication; and
providing a framework which integrates said first compiler component, said second compiler component, said first design tool, and said second design tool to provide multi-language design functionality assisting a user in writing code comprising inter-language reference requirements, wherein the framework creates a multi-language compiler and a multi-language design tool based on the first language and the second language,
where said prespecified protocol comprises a discoverability interface, and where said discovering a first compiler component and a first design tool that conform to a set of interfaces included in a prespecified protocol occurs using said discoverability interface implemented in said first compiler component and said first design tool and said discovering a second compiler component and a second design tool that conform to the set of interfaces included in said prespecified protocol occurs using said discoverability interface implemented in said second compiler component and said second design tool.

14. A method for multi-language code editing comprising:
discovering a first compiler component that conforms to a set of interfaces included in a prespecified protocol and provides compilation of code in a first language;
discovering a second compiler component that conforms to the set of interfaces included in said prespecified protocol and provides compilation of code in a second language;
discovering a first design tool that conforms to the set of interfaces included in the prespecified protocol and provides design assistance for code in said first language;
discovering a second design tool that conforms to the set of interfaces included in the prespecified protocol and provides design assistance for code in said second language,
wherein the discovery of the first compiler component, the second compiler component, the first design tool, and the second design tool is effected using an inter-process communication; and
providing a framework which integrates said first compiler component, said second compiler component, said first design tool, and said second design tool to provide multi-language design functionality incorporating background compilation, wherein the framework creates a multi-language compiler and a multi-language design tool based on the first language and the second language,
where said prespecified protocol comprises a discoverability interface, and where said discovering a first compiler component and a first design tool that conform to a set of interfaces included in a prespecified protocol occurs using said discoverability interface implemented in said first compiler component and said first design tool and said discovering a second compiler component and a second design tool that conform to the set of interfaces included in said prespecified protocol occurs using said discoverability interface implemented in said second compiler component and said second design tool.

15. A method for multi-language compilation comprising:
discovering at least two compiler components that each conform to a set of interfaces included in a prespecified protocol, wherein each of the at least two compiler components provides compilation of code in a corresponding language and the discovery of the at least two compiler components is effected using an inter-process communication; and providing a framework which integrates each of said at least two compiler components to provide multi-language compilation, wherein the framework creates a multi-language compiler based on the corresponding languages of the at least two compiler components, where said prespecified protocol comprises a discoverability interface, and where said discovering at least two compiler components that each conform to a set of interfaces included in a prespecified protocol occurs using said discoverability interface implemented in said at least two compiler components.

16. The method of claim 15, where the inter-process communication is facilitated using a Component Object Model based system.

17. The method of claim 15, where said multi-language compilation comprises multi-language compilation to a target platform specified at compilation time.

18. A computer-readable storage medium for multi-language compilation comprising computer executable modules having computer executable instructions, said instructions comprising instructions for:

discovering a first compiler component that conforms to a set of interfaces included in a prespecified protocol and provides compilation of code in a first language;

discovering a second compiler component that conforms to the set of interfaces included in said prespecified protocol and provides compilation of code in a second language, wherein the discovery of the first compiler component and the second compiler component is effected using an inter-process communication; and providing a first framework which uses said first compiler component and said second compiler component to provide multi-language compilation, wherein the framework creates a multi-language compiler based on the first language and the second language, where said prespecified protocol comprises a discoverability interface, and where said discovering a first compiler component that conforms to a set of interfaces included in a prespecified protocol occurs using said discoverability interface implemented in said first compiler component and said discovering a second compiler component that conforms to the set of interfaces included in said prespecified protocol occurs using said discoverability interface implemented in said second compiler component.

19. The computer-readable storage medium of claim 18, said instructions further comprising:

discovering a third compiler component which implements said prespecified protocol; and providing a second framework which integrates said first, second, and third compiler components to provide multi-language compilation.

20. The computer-readable storage medium of claim 18, where said prespecified protocol comprises a compilation time interface, and where said provision of multi-language compilation occurs using said compilation time interface implemented in said first compiler component, and said compilation time interface implemented in said second compiler component.

21. The computer-readable storage medium of claim 20, where said compilation time interface comprises a normalized referencing scheme describing how code in other languages references code compiled by a compiler implementing said normalized referencing scheme.

22. The computer-readable storage medium of claim 20, where said compilation time interface comprises data regarding how dependency trees are to be built.

23. The computer-readable storage medium of claim 20, where said compilation time interface comprises data regarding the order of compilation of different languages in which code to be compiled has been written.

24. The computer-readable storage medium of claim 18, where said prespecified protocol comprises a debugging interface, and where said first framework further provides multi-language debugging according to information from said debugging interface.

25. The computer-readable storage medium of claim 18, where said prespecified protocol comprises an error interface, and where said first framework further provides multi-language error handling according to information from said error interface.

26. The computer-readable storage medium of claim 18, where said first framework further provides a multi-language design tool for designing code comprising code portions in said first language and code portions in said second language.

27. The computer-readable storage medium of claim 26, where said prespecified protocol comprises a design time interface, and where said multi-language design tool uses said design time interface corresponding to a compiler for a given language to control designing of code in said given language.

28. The computer-readable storage medium of claim 26, where said prespecified protocol comprises a background compilation time interface, and where said multi-language design tool uses a background compilation time interface corresponding to a compiler for a given language to control background compilation functionality for code in said given language.

29. A computer-readable storage medium for multi-language code editing comprising computer executable modules having computer executable instructions, said instructions comprising instructions for:

discovering a first design tool that conforms to a set of interfaces included in a prespecified protocol and provides design assistance for code in a first language;

discovering a second design tool that conforms to the set of interfaces included in the prespecified protocol and provides design assistance for code in a second language, wherein the discovery of the first design tool and the second design tool is effected using an inter-process communication; and providing a framework which integrates said first design tool and said second design tool to provide multi-language editing, wherein the framework creates a multi-language design tool based on the first language and the second language, where said prespecified protocol comprises a discoverability interface, and where said discovering a first design tool that conforms to a set of interfaces included in a prespecified protocol occurs using said discoverability interface implemented in said first design tool and said discovering a second design tool that conforms to the set of interfaces included in said prespecified protocol occurs using said discoverability interface implemented in said second design tool.

30. A computer-readable storage medium for multi-language code editing comprising computer executable modules having computer executable instructions, said instructions comprising instructions for:

discovering a first compiler component that conforms to a set of interfaces included in a prespecified protocol and provides compilation of code in a first language;

discovering a second compiler component that conforms to the set of interfaces included in said prespecified protocol and provides compilation of code in a second language;

discovering a first design tool that conforms to the set of interfaces included in the prespecified protocol and provides design assistance for code in said first language;

discovering a second design tool that conforms to the set of interfaces included in the prespecified protocol and provides design assistance for code in said second language, wherein the discovery of the first compiler component, the second compiler component, the first design tool, and the second design tool is effected using an inter-process communication; and providing a framework which integrates said first compiler component, said second compiler component, said first design tool, and said second design tool to provide multi-language design functionality assisting a user in writing code comprising inter-language reference requirements, wherein the framework creates a multi-language compiler and a multi-language design tool based on the first language and the second language, where said prespecified protocol comprises a discoverability interface, and where said discovering a first compiler component and a first design tool that conform to a set of interfaces included in a prespecified protocol occurs using said discoverability interface implemented in said first compiler component and said first design tool and said discovering a second compiler component and a second design tool that conform to the set of interfaces included in said prespecified protocol occurs using said discoverability interface implemented in said second compiler component and said second design tool.

31. A computer-readable storage medium for multi-language code editing comprising computer executable modules having computer executable instructions, said instructions comprising instructions for:

discovering a first compiler component that conforms to a set of interfaces included in a prespecified protocol and provides compilation of code in a first language;

discovering a second compiler component that conforms to the set of interfaces included in said prespecified protocol and provides compilation of code in a second language;

discovering a first design tool that conforms to the set of interfaces included in the prespecified protocol and provides design assistance for code in said first language;

discovering a second design tool that conforms to the set of interfaces included in the prespecified protocol and provides design assistance for code in said second language, wherein the discovery of the first compiler component, the second compiler component, the first design tool, and the second design tool is effected using an inter-process communication; and providing a framework which integrates said first compiler component, said second compiler component, said first design tool, and said second design tool to provide multi-language design functionality incorporating background compilation, wherein the framework creates a multi-language compiler and a multi-language design tool based on the first language and the second language, where said prespecified protocol comprises a discoverability interface, and where said discovering a first compiler component and a first design tool that conform to a set of interfaces included in a prespecified protocol occurs using said discoverability interface implemented in said first compiler component and said first design tool and said discovering a second compiler component and a second design tool that conform to the set of interfaces included in said prespecified protocol occurs using said discoverability interface implemented in said second compiler component and said second design tool.

32. A computer-readable storage medium for multi-language code compilation comprising computer executable modules having computer executable instructions, said instructions comprising instructions for:

discovering at least two compiler components that each conform to a set of interfaces included in a prespecified protocol, wherein each of the at least two compiler components provides compilation of code in a corresponding language and the discovery of the at least two compiler components is effected using an inter-process communication; and providing a framework which integrates each of said at least two compiler components to provide multi-language compilation, wherein the framework creates a multi-language compiler based on the corresponding languages of the at least two compiler components, where said prespecified protocol comprises a discoverability interface, and where said discovering at least two compiler components that each conform to a set of interfaces included in a prespecified protocol occurs using said discoverability interface implemented in said at least two compiler components.

33. The computer-readable storage medium of claim 32, where the inter-process communication is facilitated using a Component Object Model based system.

34. The computer-readable storage medium of claim 32, where said multi-language compilation comprises multi-language compilation to a target platform specified at compilation time.

* * * * *